No. 883,577. PATENTED MAR. 31, 1908.
W. B. SCHULTZ.
YARD METER.
APPLICATION FILED DEC. 7, 1907.
2 SHEETS—SHEET 1.
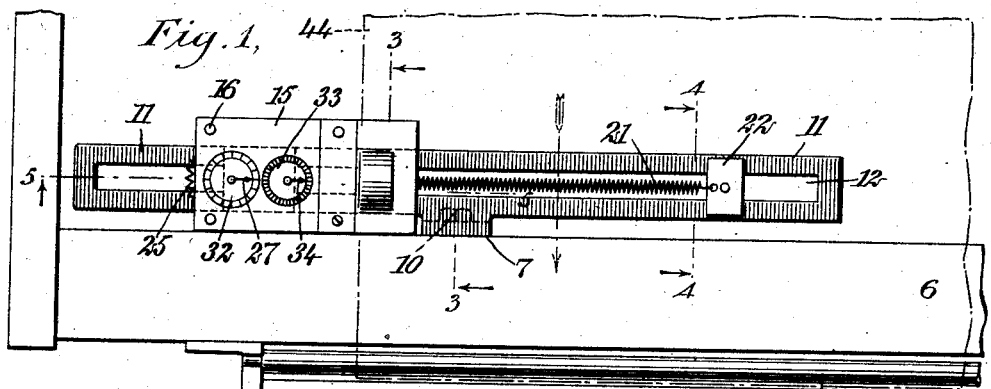
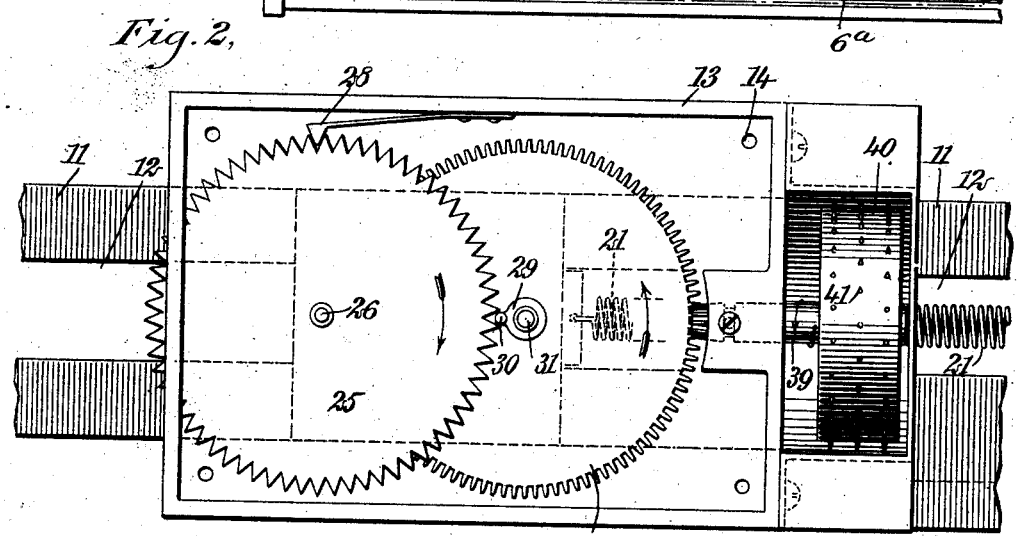
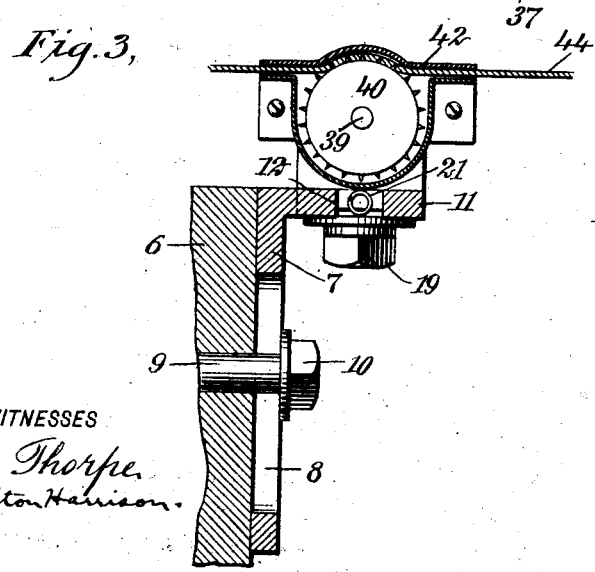
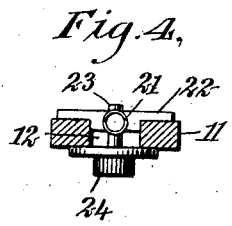
WITNESSES
Edw. Thorpe
Walton Harrison
INVENTOR
William B. Schultz
BY Munn & Co
ATTORNEYS No. 883,577. PATENTED MAR. 31, 1908.
W. B. SCHULTZ.
YARD METER.
APPLICATION FILED DEC. 7, 1907.
2 SHEETS—SHEET 2.
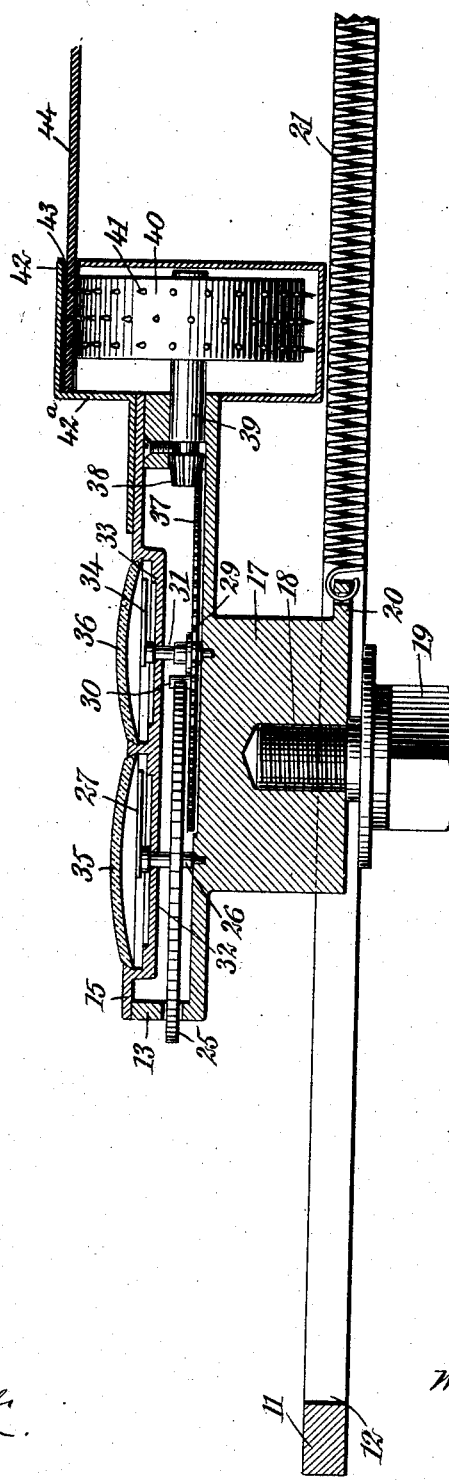
WITNESSES
Edward Thorpe,
Walton Harrison.
INVENTOR
William B. Schultz
BY
ATTORNEYS

UNITED STATES PATENT OFFICE.

WILLIAM B. SCHULTZ, OF PHILLIPSBURG, NEW JERSEY.

YARD-METER.

No. 883,577. Specification of Letters Patent. Patented March 31, 1908.

Application filed December 7, 1907. Serial No. 405,529.

*To all whom it may concern:*

Be it known that I, WILLIAM B. SCHULTZ, a citizen of the United States, and a resident of Phillipsburg, in the county of Warren and State of New Jersey, have invented a new and Improved Yard-Meter, of which the following is a full, clear, and exact description.

My invention relates to measuring instruments, my more particular object being to provide a type of yard meter for measuring cloth and so arranged as to note measurements of yards and fractions thereof, and also inches and fractions of the same.

My invention further relates to adjusting mechanism whereby the general position occupied by the yard meter may be varied automatically in relation to the supporting framework, in such manner as to cause the yard meter to operate upon only the selvage or some other predetermined portion of the cloth to be measured, the general position occupied by the yard meter varying from time to time with variations in the width or position of the cloth.

My invention still further relates to various adjustments whereby the general efficiency and accuracy of the device may be increased.

My invention has a special service in connection with weaving machines and looms, but I do not limit myself to this particular application.

Reference is to be had to the accompanying drawings forming a part of this specification, in which similar characters of reference indicate corresponding parts in all the figures.

Figure 1 is a fragmentary plan showing the meter box slidably mounted upon a bracket and loose relatively to the same, so as to have a certain range of movement in order to conform to any accidental variation in the width of the cloth, being drawn against the selvage of the cloth by a spring for the purpose; Fig. 2 is an enlarged fragmentary plan showing the meter box with its top removed so as to disclose the gearing and cloth wheel for turning the same; Fig. 3 is an enlarged vertical section upon the line 3—3 of Fig. 1, looking in the direction of the arrows and showing how the slide is adjustably mounted upon the framework, this view further showing how the cloth is continuously fed over the cloth wheel so as to turn the latter; Fig. 4 is a vertical section upon the line 4—4 of Fig. 1, looking in the direction of the arrows and showing the slide mounted upon the bracket for holding one end of the spring, this view further showing means whereby the slide is temporarily held in predetermined positions; Fig. 5 is an enlarged vertical section upon the line 5—5 of Fig. 1, looking in the direction of the arrow, this view showing the general arrangement of the dial hands, the gearing for actuating the same, and the cloth wheel for turning such gearing, this view showing in addition the spring for drawing the meter box against the selvage of the cloth.

At 6 is a beam constituting a part of the framework of a loom, and at $6^a$ is a guide roller over which the cloth passes as rapidly as woven. A bracket 7 is provided with a vertically disposed slot 8 and through this slot a bolt 9 extends, this bolt being provided with an angular head 10 whereby it may be turned so as to secure the bracket 7 rigidly in position. The bracket may be raised or lowered and tightened in position by means of the bolt 9. The bracket 7 is provided with a shelf 11 projecting horizontally, and the upper surface of this shelf is normally flush with the upper surface of the beam 6, as will be understood from Fig. 3. The shelf 11 is quite long and is provided with a slot 12 extending almost from one end of the shelf to the other, as will be understood from Fig. 1.

A meter box is shown at 13 and is provided with holes 14 and with a cover 15 secured in position by means of bolts 16. The meter box 13 is provided with a base 17 into which extends a threaded bolt 18 provided with a head 19. The base 17 is provided with a tongue 20 which projects into the slot 12, as will be understood from Fig. 5. This base slides relatively to the shelf 11; the tongue 20 preventing lateral displacement of the base and holding the parts in proper position.

A spiral spring 21 is connected with the tongue 20 and is disposed centrally of the slot 12. A slide 22 is mounted upon the shelf 11, and a screw bolt 23 extends through this slide and is provided with a milled head 24 whereby it may be turned. By tightening the screw bolt the slide 22 may be fixed relatively to the shelf 11 (see Figs. 1 and 4). The bolt 18 (see Fig. 5) may be tightened so as to clamp the base 17 rigidly in relation to the shelf 11. Ordinarily, however, I leave the base 17 loose and merely turn the bolt 18 to such an extent as to prevent any false play of the base 17 and parts carried by it relatively to the shelf.

A spur wheel 25 is mounted upon a stub shaft 26 and mounted rigidly upon the latter is a hand 27. A spring pawl 28 (see Fig. 2) prevents retrograde motion and false play of the spur wheel 25. A collar 29 is provided with a button 30 and is mounted upon a revoluble stub shaft 31 in such manner that each revolution of the collar and stub shaft causes the button 30 to move one tooth of the spur wheel 25.

Dials 32, 33 are disposed side by side and provided with graduations, the dial 32 representing yards and the dial 33 representing inches and fractions of the same. A hand 34 is mounted upon the stub shaft 31 and revoluble therewith. The hands 27 and 34 rotate in opposite directions. Crystals 35, 36 are disposed over the dials to protect the same.

A cog wheel 37 is mounted rigidly upon the stub shaft 31 and meshes with a bevel gear 38 so as to be turned thereby. The bevel gear is mounted upon a revoluble shaft 39, the latter being secured to a wheel 40 provided upon its peripheral surface with teeth 41. This wheel 40 I designate as the cloth wheel. A gage plate 42 is disposed over the cloth wheel and is separated therefrom by a slot 43. The cloth is shown at 44 and extends into this slot so as to engage a wall 42$^a$.

My invention is used as follows: The parts being in the several positions indicated, the slide 22 is adjusted according to the width of the cloth to be woven and according to the tension of the spring 21. The slide 22 is now tightened by aid of the bolt 23, the operator turning the milled head 24 for this purpose. The edge of the cloth 44 is now placed in the slot 43 and brought into engagement with the cloth wheel 40. The edge of the cloth (we will say the selvage) being brought into engagement with the wall 42$^a$, as indicated in Fig. 5, and the cloth being drawn over the guide roller 6$^a$ and put in motion, the device is thrown thereby into action. As the cloth wheel 40 is turned by the movement of the cloth, the motion is transmitted through bevel gear 38, cog wheel 37, collar 29, button 30 and spur wheel 25, the stub shafts 31 and 26 being thus rotated in opposite directions, and the hands 27, 34 being carried around correspondingly over their respective dials.

As is well known in loom work and weaving, the width of the cloth or other fabric being made varies considerably. This is compensated for by the movement of the meter box. The latter, therefore, operates as a carriage in that it travels within certain limits lengthwise of the shelf 11. The idea is that the edge of the cloth in moving freely along in contact with the wall 42$^a$ moves the carriage slightly in one direction, the spring 21 retracting it in the opposite direction. If the reflex movement caused by the spring is not sufficiently prompt, the operator moves the slide 22 to the right, according to Fig. 1, and this increases the tension of the spring 21. If the tension be too great, he moves the slide 22 to the left according to Fig. 1.

The carriage has no exact position, but plays constantly, soon assuming however, a mean position from which it does not vary within wide limits. The self-adjustability of the carriage relatively to the edge of the cloth I consider an important feature, for the reason that it renders the measurement of the length of the cloth far more accurate, and further because it allows the machine to play always upon the selvage or upon the edge of the cloth, thus doing a minimum of harm.

Having thus described my invention, I claim as new and desire to secure by Letters Patent:

1. The combination of a framework, a member mounted thereupon and normally stationary, a carriage mounted upon said member and movable relatively thereto, a meter mounted upon said carriage, and means for forcing said carriage constantly against the edge of a piece of cloth or the like as the same travels along.

2. The combination of a normally fixed member, means for securing the same upon the framework of a loom or the like, a carriage mounted upon said fixed member and adapted to move freely along the same, said carriage being provided with a slot for receiving the edge of goods in motion, measuring apparatus mounted upon said carriage for indicating the length of cloth passing said measuring apparatus, and means for adjusting the tension of said carriage relatively to the edge of said cloth.

3. The combination of a shelf provided with a slot, a carriage mounted upon said shelf and movable relatively thereto, said carriage being provided with a portion projecting into said slot, a spring connected with said carriage, means for loosening or tightening said spring at will, meter mechanism mounted upon said carriage, gearing for actuating said meter mechanism, said gearing including a cloth wheel, and means mounted upon said carriage for maintaining said cloth wheel in engagement with the cloth to be measured.

4. The combination of a frame, a bracket mounted thereupon and adjustable vertically in relation thereto, said bracket being provided with a horizontal shelf having a longitudinal slot disposed centrally thereof, a carriage slidably mounted upon said shelf and provided with a portion projecting into said slot, said carriage being further provided with a surface to be engaged by the edge of the cloth to be measured, means for moving said carriage so as to compensate for variations in the width of said cloth, and measuring mechanism mounted upon said carriage and controllable by movements of said cloth.

In testimony whereof I have signed my name to this specification in the presence of two subscribing witnesses.

WILLIAM B. SCHULTZ.

Witnesses:
C. E. WRIGHT,
OSCAR E. RUEF.